United States Patent
Steinlechner

(10) Patent No.: US 7,492,464 B2
(45) Date of Patent: Feb. 17, 2009

(54) TRIGGERING FOR A HETERODYNE INTERFEROMETER

(75) Inventor: Siegbert Steinlechner, Leonberg (DE)

(73) Assignee: Robert Bosch GmbH, Stuttgart (DE)

(*) Notice: Subject to any disclaimer, the term of this patent is extended or adjusted under 35 U.S.C. 154(b) by 141 days.

(21) Appl. No.: 10/587,421

(22) PCT Filed: Dec. 14, 2004

(86) PCT No.: PCT/EP2004/053438

§ 371 (c)(1),
(2), (4) Date: Jul. 25, 2006

(87) PCT Pub. No.: WO2005/071844

PCT Pub. Date: Aug. 4, 2005

(65) Prior Publication Data

US 2007/0153290 A1 Jul. 5, 2007

(30) Foreign Application Priority Data

Jan. 27, 2004 (DE) .................. 10 2004 004 004

(51) Int. Cl.
*G01B 9/02* (2006.01)
(52) U.S. Cl. .................................... 356/484
(58) Field of Classification Search ........... 356/484
See application file for complete search history.

(56) References Cited

U.S. PATENT DOCUMENTS 6,249,155 B1 6/2001 Hartman et al.
2003/0199115 A1 10/2003 Mattox

FOREIGN PATENT DOCUMENTS

WO WO 02/37684 5/2002

*Primary Examiner*—Hwa (Andrew) S Lee
(74) *Attorney, Agent, or Firm*—Kenyon & Kenyon LLP

(57) ABSTRACT

A method for triggering a heterodyne interferometer having two acousto-optical modulators in separate light paths, a receiver generating an analog signal and a downstream A/D converter converting the analog signal into a digital signal is described. The one acousto-optical modulator is triggered at a modulation frequency $f_1$ and the other acousto-optical modulator is triggered at another modulation frequency $f_2$, the difference between modulation frequencies $f_1$ and $f_2$ forming a heterodyne frequency $f_{Het}$ and the analog signal being converted into the digital signal in the A/D converter at sampling frequency $f_a$. In such a heterodyne interferometer, a fixed ratio of modulation frequencies is maintained, and they are prevented from shifting due to aging and drift by forming at least two of the frequencies of modulation frequencies $f_1$, $f_2$ and sampling frequency $f_a$ from a fundamental frequency $f_{qartz}$ of a common oscillator. As a result, it is also possible for sampling frequency $f_a$ to be in a fixed phase ratio to the differential frequency of modulation frequencies $f_1$, $f_2$, of heterodyne frequency $f_{Het}$. Measurement accuracy is increased because sampling is performed at a constant phase, independently of drift and aging.

14 Claims, 2 Drawing Sheets

TRIGGERING FOR A HETERODYNE INTERFEROMETER

FIELD OF THE INVENTION

The present invention relates to a method for triggering a heterodyne interferometer having two acousto-optical modulators situated in separate light paths, a receiver which generates an analog signal and a downstream A/D converter which converts the analog signal into a digital signal, the one acousto-optical modulator being triggered at a modulation frequency $f_1$ and the other acousto-optical modulator being triggered at another modulation frequency $f_2$, the difference between modulation frequencies $f_1$ and $f_2$ forming a heterodyne frequency $f_{Het}$, and the analog signal being converted to a digital signal in the A/D converter at sampling frequency $f_a$.

The present invention also relates to a device including a triggering unit and a heterodyne interferometer having two acousto-optical modulators situated in separate light paths, a receiver which supplies an analog signal and a downstream A/D converter for forming a digital signal from the analog signal, the one acousto-optical modulator being triggered at a modulation frequency $f_1$ and the other acousto-optical modulator being triggered at another modulation frequency $f_2$ and the difference between modulation frequencies $f_1$ and $f_2$ corresponding to a heterodyne frequency $f_{Het}$ and a sampling frequency $f_a$ being provided for conversion of the analog signal into the digital signal.

BACKGROUND INFORMATION

Heterodyne interferometers are used to measure the phase shift of a beam of light caused by an optical phase shifter. An optical bypass line whose length is to be measured may function as an optical phase shifter. Heterodyne interferometers are generally conventional.

In a heterodyne interferometer, the beam of a light source, usually a laser, is passed through a beam splitter to two acousto-optical modulators. The two acousto-optical modulators are triggered by frequencies $f_1$ and $f_2$ which are typically in the MHz range. The beams of light at the output of the acousto-optical modulators are shifted here by a corresponding frequency with respect to the original light frequency.

The two frequency-shifted beams of light are then sent back to a beam splitter via mirrors and combined, one of the two beams being delayed via an optical phase shifter. This may be accomplished via materials which shift the phase of light or with which the speed of the light with respect to air is reduced. According to another embodiment, the light is deflected by additional mirrors and must therefore travel through an optical bypass. After the two beams of light have been combined again by the beam splitter, e.g., in the form of a semitransparent mirror, the light is sent to a receiver containing a photodetector and usually an amplifier.

The two beams of light cause interference and generate a beat frequency known as a heterodyne frequency $f_{Het}$ in the receiver. This frequency is calculated as follows:

$$f_{Het}=|f_1-f_2|.$$

The phase of this signal, based on the phase angle of an electric signal of frequency $f_{Het}$ obtained by mixing $f_1$ with $f_2$, corresponds to the phase shift of the optical phase shifter that is to be measured.

The analog signal available at the output of the receiver is sent to a downstream A/D converter which generates a digital signal. The conversion is then performed at a sample rate of frequency $f_a$. The digital signal is then sent to an analyzer unit for further processing.

In the case of the heterodyne interferometers described above, generating frequencies $f_1$, $f_2$ and $f_a$ during operation may result in great fluctuations in heterodyne frequency $f_{Het}=|f_1-f_2|$ because the oscillators may have frequency drift with temperature and also with aging. Another disadvantage is that blanking frequency $f_a$ does not form an integral ratio with heterodyne frequency $f_{Het}$ and is not even constant.

SUMMARY

One object of the present invention is to provide a method for triggering a heterodyne interferometer that will not have these disadvantages. Another object of the present invention is to provide a corresponding device including a triggering device of a heterodyne interferometer.

In accordance with an example embodiment of the present invention, at least two of the frequencies of modulation frequencies $f_1$, $f_2$ and sampling frequency $f_a$ are formed from a fundamental frequency $f_{quartz}$ of a common oscillator. A fixed ratio of modulation frequencies may be achieved in this way and the modulation frequencies will not undergo shifts due to aging and drift. In addition, sampling frequency $f_a$ is then in a fixed phase ratio to the differential frequency of modulation frequencies $f_1$, $f_2$, i.e., heterodyne frequency $f_{Het}$. Measurement accuracy is increased because sampling is performed at a constant phase, independently of drift and aging.

If modulation frequencies $f_1$ and $f_2$ are generated from fundamental frequency $f_{quartz}$ using the method of direct digital synthesis (DDS) by incrementing a digital accumulator of word width N by an integer Z for each clock pulse of the oscillator designed as a quartz oscillator having fundamental frequency $f_{quartz}$, the signals may be supplied inexpensively in a strictly digital manner. Furthermore, the modulation frequencies may be freely programmed with these signals.

If modulation frequencies $f_1$ and $f_2$ are generated separately from fundamental frequency $f_{quartz}$ in separate DDS units, inexpensive commercially available integrated circuits may be used.

According to an example embodiment having a linear phase course which is particularly easy to implement, a sawtooth-shaped value curve of the contents of the digital accumulator is obtained by incrementing the digital accumulator.

A particularly suitable strictly sinusoidal triggering for modulation of acousto-optical modulators may be achieved by interpreting the value curve in the digital accumulator as a phase value of a cosine oscillation, determining a sample of a cosine oscillation using a table stored in a ROM and/or algorithmic methods from the phase value and smoothing them in an analog low-pass filter.

In a simplified circuit design, sampling frequency $f_a$ for the A/D converter is formed by a divider unit from modulation frequency $f_1$ or sampling frequency $f_a$ for the A/D converter is formed by a divider unit from modulation frequency $f_2$, thus making it possible to eliminate an additional oscillator.

Measurement accuracy is improved if sampling frequency $f_a$ is an integral multiple of heterodyne frequency $f_{Het}$.

If the ratio between sampling frequency $f_a$ and heterodyne frequency $f_{Het}$ is a factor of at least 2, good measurement accuracy is achieved with minimal circuit complexity.

An object of the present invention relating to the device is achieved by the fact that the triggering device for generating at least two of the frequencies, i.e., from modulation frequencies $f_1$, $f_2$ and sampling frequency $f_a$, has a common oscillator having fundamental frequency $f_{quartz}$. This achieves a measurement accuracy which does not depend on drift or component aging and does so with minimal circuit complexity.

According to a preferred embodiment, a direct digital synthesizer (DDS) is provided for generating modulation frequencies $f_1$ and $f_2$ from fundamental frequency $f_{quartz}$ and has a digital accumulator of word width N which is incrementable by an integer Z via an incrementation stage for each clock unit of oscillator 100 which has a clock frequency $f_{quartz}$ and is designed as a quartz oscillator. As a result, signals are generated inexpensively in a digital manner and are programmed freely.

If separate DDS units are provided for generating modulation frequencies $f_1$ and $f_2$, inexpensive commercially available components may be used.

In a simplified circuit design, a divider unit is provided for generating sampling frequency $f_a$ from modulation frequency $f_1$ or a divider unit is provided for generating sampling frequency $f_a$ from modulation frequency $f_2$.

In a preferred embodiment, the division ratio of the divider unit is an integer. This yields a particularly good measurement accuracy.

In a simple embodiment having good measurement accuracy, the division ratio of the divider unit is at least 2.

BRIEF DESCRIPTION OF THE DRAWINGS

The present invention is explained in greater detail below on the basis of exemplary embodiments as illustrated in the figures.

DETAILED DESCRIPTION OF EXAMPLE EMBODIMENTS

Figure 1:
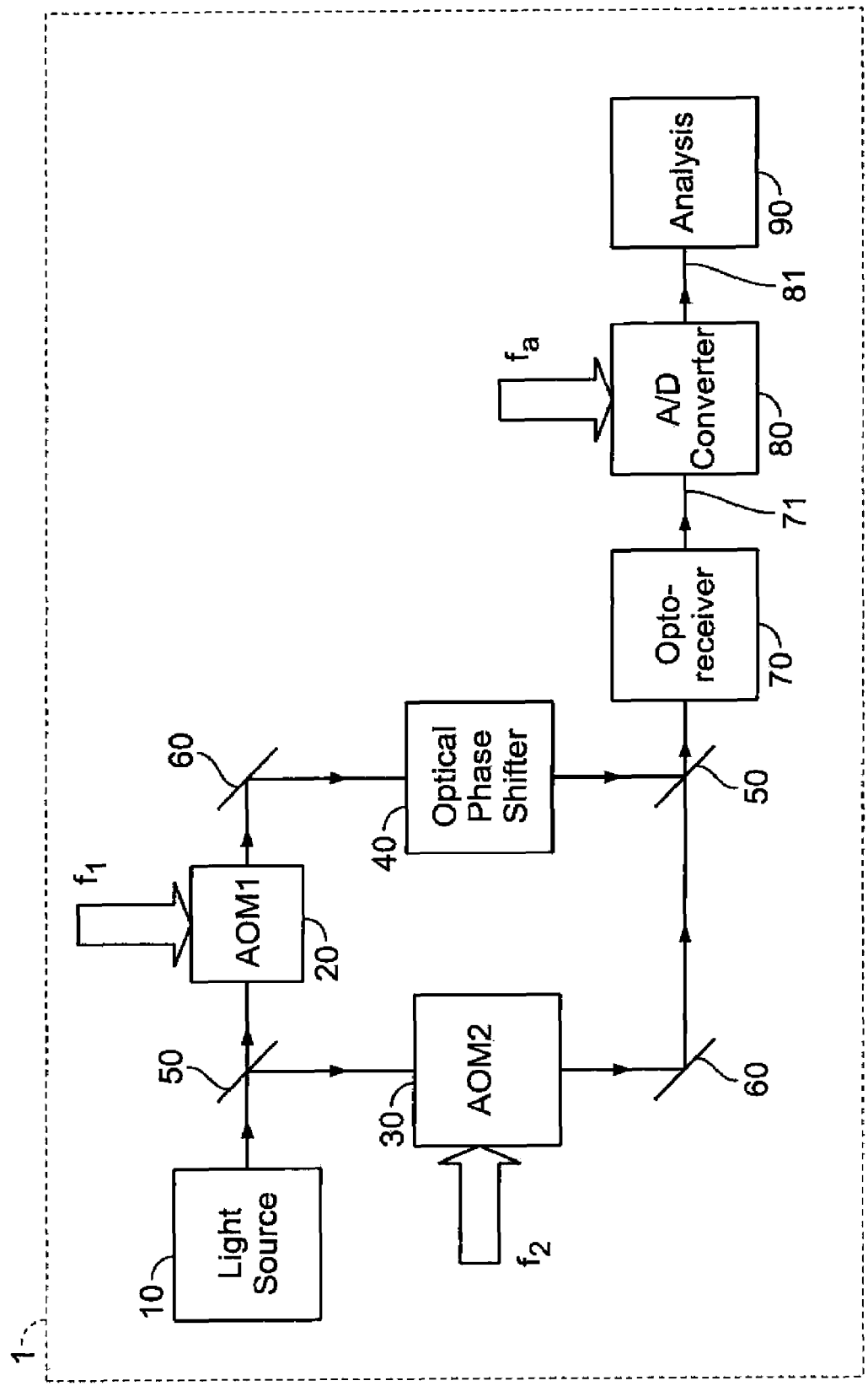
FIG. 1 schematically shows a conventional heterodyne interferometer.

FIG. 1 schematically shows a conventional heterodyne interferometer.

The beam of a light source 10 is passed through a beam splitter 50 to two acousto-optical modulators 20, 30, labeled as AOM1 and AOM2 in the figure. Acousto-optical modulators 20, 30 are triggered at frequencies $f_1$ and $f_2$, typically in the MHz range. The beams of light at the output of acousto-optical modulators 20, 30 are shifted by the corresponding frequency with respect to the original light frequency. Light source 10 is preferably a laser having a long coherence length. The two frequency-shifted beams of light are then sent via mirrors 60 back to a beam splitter 50 and combined, one of the two beams being delayed by an optical phase shifter 40. This may be accomplished by using materials that shift the phase of light or in which the speed of the light is reduced with respect to air. According to another embodiment, light is deflected by additional mirrors and therefore must pass through an optical bypass. After the two beams of light have been combined again by beam splitter 50, e.g., in the form of a semitransparent mirror, the light is sent to a receiver 70. Receiver 70 includes a photodetector having a downstream amplifier that supplies an analog signal 71. The amplifier may be integrated into receiver 70.

Both beams of light produce interference and generate a beat frequency known as heterodyne frequency $f_{Het}$, in receiver 70. This frequency is calculated by the formula $$f_{Het}=|f_1-f_2|.$$

The phase of this signal based on the phase angle of an electric signal of frequency $f_{Het}$ obtained by mixing $f_1$ with $f_2$ corresponds to the phase shift of optical phase shifter 40 that is to be measured.

Analog signal 71 which is available at the output of receiver 70 is sent to a downstream A/D converter 80 which generates a digital signal 81. The conversion takes place at a sampling rate of frequency $f_a$. Digital signal 81 is then sent to an analyzer unit 90 for further processing.

Conventionally, frequencies $f_1$, $f_2$ and $f_a$ are obtained from separate quartz oscillators, which have the same disadvantages as those mentioned above with regard to the stability of the frequency ratio.

Figure 2:
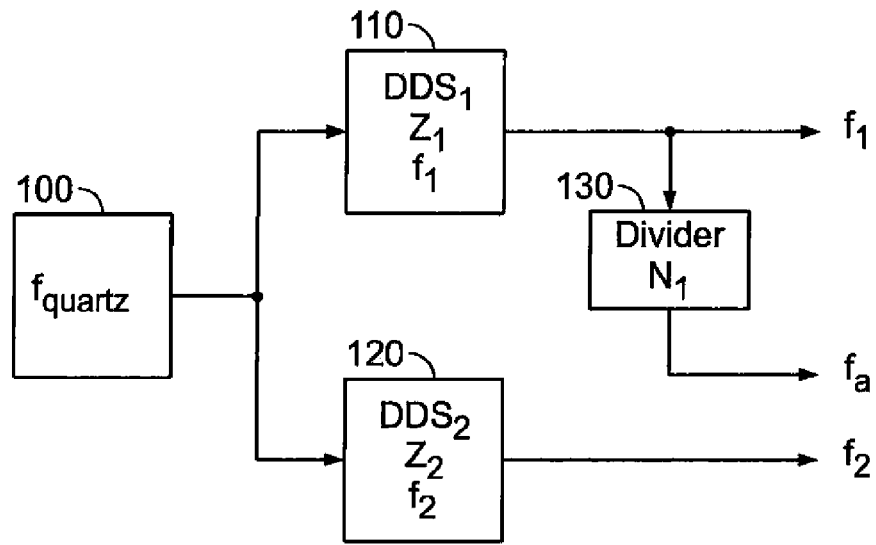
FIG. 2 schematically shows an oscillator system for a heterodyne interferometer.

FIG. 2 shows an oscillator system for a heterodyne interferometer according to the present invention.

To generate AOM frequencies $f_1$ and $f_2$, the DDS method, i.e., direct digital synthesis, is used. In this method a digital accumulator of word width N is incremented by an integer Z for each clock pulse of an oscillator 100 designed as a quartz oscillator and having clock frequency $f_{quartz}$. The accumulator then overflows periodically due to the constant incrementing. The value curve in the accumulator over time corresponds to a sawtooth function having value range 0 to $2^N-1$ (N may be 32, for example). The values in the accumulator are interpreted as phase value $$F=(2*\pi*Z)/2^N$$

of a cosine oscillation. By using a ROM table and/or algorithmic methods, a sample value cos(F) of the cosine oscillation is formed from this phase value. This sample value is output via a D/A converter and filtered through a low-pass filter accordingly, yielding a time-continuous cosine analog signal of frequency $$f=f_{quartz}*Z/2^N.$$

Direct digital synthesizers may be integrated circuits and form a DDS unit. Using this integrated circuit, high-precision frequency generators are inexpensively tunable in the range of 0 to approximately ⅓ the fundamental frequency with a high resolution by programming using a fundamental frequency.

According to the present invention, two AOM frequencies $f_1$ and $f_2$ are generated by separate DDS units 110, 120, an increment value $Z_1$ for DDS unit 110 and an increment value $Z_2$ for DDS units 120 being preselected. It is also characteristic that the fundamental frequency for both DDS units 110, 120 is formed by a common oscillator 100.

The following equations are obtained for AOM frequencies $f_1$ and $f_2$, heterodyne frequency $f_{Het}$ and increment values $Z_1$ and $Z_2$:

$$f_1=f_{quartz}*Z_1/2^N$$

$$f_2=f_{quartz}*Z_2/2^N$$

$$f_{Het}=|f_1-f_2|=f_{quartz}*(|Z_1-Z_2|)/2^N.$$

In the exemplary embodiment shown here, sample rate $f_a$ of A/D converter 80 is obtained by direct division of frequency $f_1$ by an integral factor $N_1$. This is implemented in an integrated divider unit 130, for example.

With regard to the precision of sampling by A/D converter 80, it may be advantageous if sampling rate $f_a$ amounts to exactly k times heterodyne frequency $f_{Het}$, where k is an integer.

This yields the following equation:

$$f_a=k*f_{Het}=f_1/N_1.$$

The following equation is thus obtained for division factor $N_1$:

$$N_1 = \{f_1/(k*f_{Het})\} \text{rounded}.$$

Since $Z_1$ must be an integral multiple of $N_1*k$, this yields the following equation for $Z_1$:

$$Z_1 = k*N_1 * \{(2^N * f_1)/(k*N_1*f_{quartz})\} \text{rounded}.$$

For $Z_2$ it then holds that:

$$Z_2 = Z_1 * \{1 + 1/(k*N_1).\}$$

In one exemplary embodiment the following values are selected:

$$f_{quartz} = 120 \text{ MHz},$$

$$f_1 = \text{approx. }34.9 \text{ MHz and } f_2 = \text{approx. }35.1 \text{ MHz and thus } f_{Het} = \text{approx. }0.2 \text{ MHz},$$

$$k = 4.$$

These are obtained with $N=32$ and $N_1=44$ by selecting $$Z_1 = 1249119696 \text{ and } Z_2 = 1256216967,$$

which thus yields:

$$f_1 = 34.9000011 \text{ MHz and } f_2 = 35.0982966 \text{ MHz},$$

$$f_{Het} = 0.1982955 \text{ MHz and } f_a = 0.7931818 \text{ MHz}.$$

Figure 3:
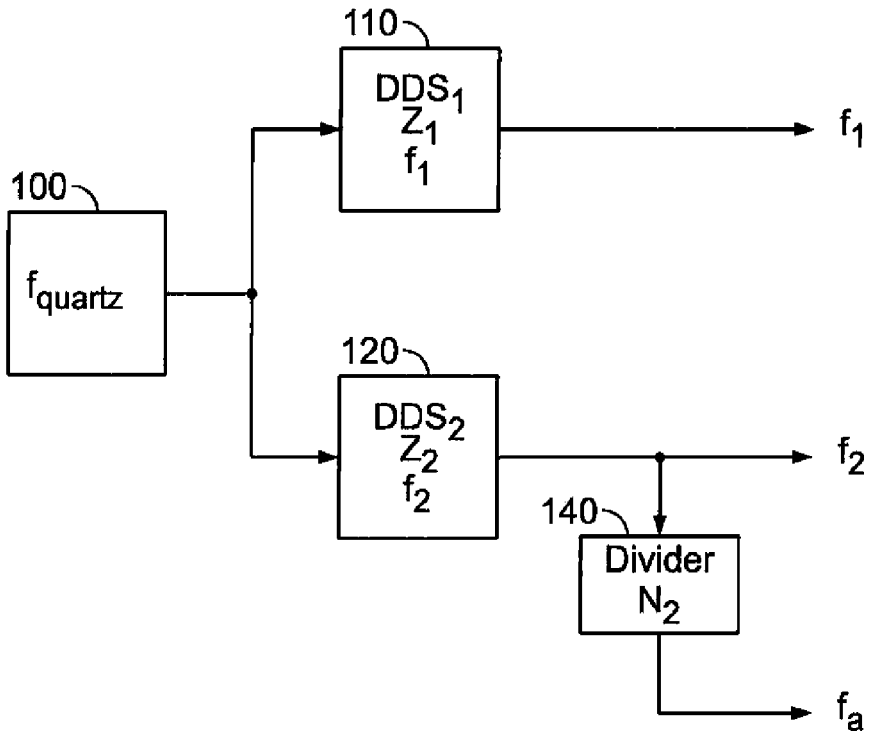
FIG. 3 schematically shows another embodiment of an oscillator system.

FIG. 3 shows another embodiment of an oscillator system for a heterodyne interferometer. In contrast to the embodiment illustrated in FIG. 2, sampling frequency $f_a$ is generated by a divider unit 140 from frequency $f_2$. The following equations are obtained analogously to the exemplary embodiment described above:

$$f_a = k*f_{Het} = f_2/N_2$$

$$N_2 = \{f_2/(k*f_{Het})\} \text{rounded}$$

$$Z_2 = k*N_2 * \{(2^N * f_2)/(k*N_2*f_{quartz})\} \text{rounded}$$

$$Z_1 = Z_2 * \{1 - 1/(k*N_2)\}$$

The following values are selected in this exemplary embodiment:

$$f_{quartz} = 120 \text{ MHz},$$

$$f_1 = \text{approx. }34.9 \text{ MHz and } f_2 = \text{approx. }35.1 \text{ MHz and thus } f_{Het} = \text{approx. }0.2 \text{ MHz},$$

$$k = 4.$$

These are obtained with $N=32$ and $N_2=44$ by selecting $$Z_1 = 1249140025 \text{ and } Z_2 = 1256277968,$$

which thus yields:

$$f_1 = 34.9005691 \text{ MHz and } f_2 = 35.1000009 \text{ MHz},$$

$$f_{Het} = 0.1994318 \text{ MHz and } f_a = 0.7977273 \text{ MHz}.$$

Thus, according to the present invention, corresponding frequencies for heterodyne interferometers are achievable inexpensively using the DDS units described above because high precision frequencies may be generated, yielding a particular frequency stability which is advantageous for certain measurement jobs.

A method for triggering a heterodyne interferometer having two acousto-optical modulators in separate light paths, a receiver generating an analog signal and a downstream A/D converter converting the analog signal into a digital signal is described. The one acousto-optical modulator is triggered at a modulation frequency $f_1$ and the other acousto-optical modulator is triggered at another modulation frequency $f_2$, the difference between modulation frequencies $f_1$ and $f_2$ forming a heterodyne frequency $f_{Het}$ and the analog signal being converted into the digital signal in the A/D converter at sampling frequency $f_a$. In such a heterodyne interferometer, a fixed ratio of modulation frequencies is maintained, and they are prevented from shifting due to aging and drift by forming at least two of the frequencies of modulation frequencies $f_1$, $f_2$ and sampling frequency $f_a$ from a fundamental frequency $f_{quartz}$ of a common oscillator. As a result, it is also possible for sampling frequency $f_a$ to be in a fixed phase ratio to the differential frequency of modulation frequencies $f_1$, $f_2$, of heterodyne frequency $f_{Het}$. Measurement accuracy is increased because sampling is performed at a constant phase, independently of drift and aging.

What is claimed is:

1. A method for triggering a heterodyne interferometer, the interferometer including two acousto-optical modulators situated in separate light paths, a receiver configured to generate an analog signal, and a downstream analog-to-digital (A/D) converter configured to convert the analog signal into a digital signal, the method comprising:

triggering a first one of the acousto-optical modulators using a first modulator frequency;

triggering a second one of the acousto-optical modulators using a second modulation frequency, a difference between the first modulation frequency and the second modulation frequency forming a heterodyne frequency; and converting the analog signal into a digital signal by the A/D converter using a sampling frequency;

wherein at least two of the first modulation frequency, the second modulation frequency and the sampling frequency is formed from a fundamental frequency of a common oscillator.

2. The method as recited in claim 1, wherein the first modulation frequency and the second modulation frequency are generated from the fundamental frequency by a method of direct digital synthesis (DDS) by incrementing a digital accumulator of word width N by an integer Z for each clock pulse of the oscillator, the oscillator being a quartz oscillator having the fundamental frequency.

3. The method as recited in claim 1, wherein the first modulation frequency and the second modulation frequency are generated separately in separate direct digital synthesis units from the fundamental frequency.

4. The method as recited in claim 2, wherein a sawtooth-shaped value curve of contents of the digital accumulator is formed by incrementing the digital accumulator.

5. The method as recited in claim 2, wherein a value curve in the digital accumulator is interpreted as a phase value of a cosine oscillation, a sample value of a cosine oscillation being determined from the phase value via at least one of a table stored in a ROM, and an algorithmic method, and the cosine oscillation being smoothed in an analog low-pass filter.

6. The method as recited in claim 1, wherein the sampling frequency of the A/D converter is formed by a divider unit from one of the first modulation frequency and the second modulation frequency.

7. The method as recited in claim 1, wherein the sampling frequency is an integral multiple of the heterodyne frequency.

8. The method as recited in claim 7, wherein a ratio between the sampling frequency and the heterodyne frequency is a factor of at least 2.

9. A device, comprising:

a heterodyne interferometer including two acousto-optical modulators situated in separate light paths, a receiver configured to supply an analog signal, and a downstream analog to digital (A/D) converter configured to form a digital signal from the analog signal, a first one of the acousto-optical modulators being triggered by a first modulation frequency, and a second one of the acousto-optical modulators being triggered by a second modulation frequency, a difference between the first modulation frequency and the second modulation frequency corresponding to a heterodyne frequency, and a sampling frequency being provided for conversion of the analog signal into the digital signal; and a triggering unit configured to generate at least two of the first modulation frequency, the second modulation frequency, and the sampling frequency, the triggering unit including a common oscillator having a fundamental frequency.

10. The device as recited in claim 9, wherein the triggering unit includes a direct digital synthesizer to generate the first modulation frequency and the second modulation frequency from the fundamental frequency, the DDS including a digital accumulator of word width N which is incrementable by an integer Z via an incrementation stage per each clock unit of the oscillator, the oscillator being a quartz oscillator and having the fundamental frequency.

11. The device as recited in claim 8, wherein the triggering unit includes separate direct digital synthesizer (DDS) units to generate modulation frequency.

12. The device as recited in claim 8, wherein the triggering unit includes a divider unit to generate the sampling frequency from one of the first modulation frequency or the second modulation frequency.

13. The device as recited in claim 12, wherein a division ratio of the divider unit is an integer.

14. The device as recited in claim 12, wherein a division ratio of the divider unit is at least 2.

* * * * *